United States Patent
Kang et al.

(10) Patent No.: US 12,529,948 B2
(45) Date of Patent: Jan. 20, 2026

(54) IMAGE PROJECTION DEVICE

(71) Applicant: LG ELECTRONICS INC., Seoul (KR)

(72) Inventors: Bokyung Kang, Seoul (KR); Gunyoung Hong, Seoul (KR); Younggil Yoo, Seoul (KR); Minsung Kim, Seoul (KR); Kyungpil Kim, Seoul (KR); Seungmi Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/574,614

(22) PCT Filed: Jul. 12, 2021

(86) PCT No.: PCT/KR2021/008918
§ 371 (c)(1),
(2) Date: Dec. 27, 2023

(87) PCT Pub. No.: WO2023/277232
PCT Pub. Date: Jan. 5, 2023

(65) Prior Publication Data
US 2024/0184190 A1    Jun. 6, 2024

(30) Foreign Application Priority Data

Jun. 30, 2021   (KR) .................. 10-2021-0085735

(51) Int. Cl.
*G03B 21/20* (2006.01)
*C09K 11/77* (2006.01)

(52) U.S. Cl.
CPC ........ *G03B 21/204* (2013.01); *C09K 11/7774* (2013.01)

(58) Field of Classification Search
CPC .. G03B 21/204; C09K 11/7774; C09K 11/77; C09K 11/7715; C09K 11/7766; H04N 9/31; H04N 9/3117
See application file for complete search history.

(56) References Cited

U.S. PATENT DOCUMENTS

| 9,406,849 B2 * | 8/2016 | Bechtel ................. H01L 33/507 |
| 2012/0201030 A1 * | 8/2012 | Yuan .................... H04N 9/3161 362/293 |

(Continued)

FOREIGN PATENT DOCUMENTS

| JP | 5915309 | 5/2016 |
| JP | 6098742 | 3/2017 |

(Continued)

OTHER PUBLICATIONS

PCT International Application No. PCT/KR2021/008918, International Search Report dated Mar. 22, 2022, 4 pages.

(Continued)

*Primary Examiner* — Tsion Tumebo
(74) *Attorney, Agent, or Firm* — LEE, HONG, DEGERMAN, KANG & WAIMEY

(57) ABSTRACT

An image projection apparatus is disclosed. The image projection apparatus according to an embodiment of the present disclosure includes: a light source configured to output blue light; and a phosphor wheel configured to output a plurality of colors of light based on the blue light incident upon rotation, wherein the phosphor wheel includes: a substrate; a yellow phosphor disposed in a first region on the substrate for output of yellow light; and a green phosphor disposed in a second region on the substrate for output of green light, wherein the green phosphor includes (Lu1−xYx)3Al5O12, with 0<x<0.8. Accordingly, highly efficient light output may be provided, and color purity may be improved.

13 Claims, 15 Drawing Sheets

(56) References Cited

U.S. PATENT DOCUMENTS

| | | | |
|---|---|---|---|
| 2014/0029237 A1* | 1/2014 | Mehl ..................... | H04N 9/31 362/84 |
| 2014/0152173 A1* | 6/2014 | Oshio ................ | C09K 11/7792 313/503 |
| 2014/0211169 A1* | 7/2014 | Kitano ................ | H04N 9/3114 353/31 |
| 2015/0124431 A1* | 5/2015 | Motoya ............... | G02B 26/008 362/84 |
| 2016/0102820 A1* | 4/2016 | Chang ................. | G02B 5/0816 362/343 |
| 2016/0165194 A1* | 6/2016 | Hartwig .............. | H04N 9/3111 353/31 |
| 2017/0082912 A1* | 3/2017 | Wakabayashi ..... | G03B 21/2013 |
| 2017/0277029 A1* | 9/2017 | Chang ................. | H04N 9/3105 |
| 2019/0004409 A1* | 1/2019 | Nishikawa .......... | G03B 21/204 |
| 2019/0270116 A1* | 9/2019 | Chang ................. | H04N 9/3158 |
| 2019/0317388 A1* | 10/2019 | Chen ................... | G02B 26/008 |
| 2019/0369472 A1* | 12/2019 | Bai ..................... | G03B 21/208 |

FOREIGN PATENT DOCUMENTS

| | | |
|---|---|---|
| JP | 2020-098913 | 6/2020 |
| KR | 10-2017-0133936 | 12/2017 |
| KR | 10-2018-0017995 | 2/2018 |

OTHER PUBLICATIONS

Korean Intellectual Property Office Application No. 10-2021-0085735, Office Action dated Feb. 28, 2025, 5 pages.

\* cited by examiner

| $(Lu_{1-x}Y_x)_3Al_5O_{12}$ | RELATIVE LUMINANCE |
|---|---|
| x=0 | 100% |
| x=0.2 | 106% |
| x=0.3 | 107% |
| x=0.5 | 106% |
| x=0.8 | 100% |

FIG. 9B

| $Y(A_{1-z}, Ga_z)_5O_{12}:Ce$ | RELATIVE LUMINANCE |
|---|---|
| z=0 | 100% |
| z=0.4 | 105% |
| z=0.6 | 105% |
| z=0.8 | 101% |

FIG. 9C

| $Y_3(Al_{1-y}, Gd_y)_5O_{12}:Ce$ | RELATIVE LUMINANCE |
|---|---|
| y=0 | 100% |
| y=0.2 | 102% |
| y=0.5 | 101% |
| y=0.8 | 94% |

| THICKNESS OF PHOSPHOR LAYER | RELATIVE LUMINANCE | REMARK |
|---|---|---|
| 20um | 100% | ADHESION IS WEAK DUE TO SMALL THICKNESS |
| 500um | 107% | |
| 100um | 107% | |
| 200um | 103% | |
| 300um | 99% | |
| 400um | 80% | |

FIG. 10A

| CATEGORY | COMPOSITION OF PHOSPHOR | | | RELATIVE LUMINANCE |
|---|---|---|---|---|
| | FIRST PHOSPHOR | SECOND PHOSPHOR | THIRD PHOSPHOR | |
| EXAMPLE 1 | $Y(Al_{1-z},Ga_z)_5O_{12}:Ce\ (z=0.4)$ | $(Lu_{1-x}Y_x)_3Al_5O_{12}:Ce\ (x=0.2)$ | $Y_3(Al_{1-y},Gd_y)_5O_{12}:Ce\ (y=0.3)$ | 107% |
| EXAMPLE 2 | $Y_3Al_5O_{12}:Ce$ | $(Lu_{1-x}Y_x)_3Al_5O_{12}:Ce\ (x=0.2)$ | $Y_3(Al_{1-y},Gd_y)_5O_{12}:Ce\ (y=0.3)$ | 104% |
| EXAMPLE 3 | $Y(Al_{1-z},Ga_z)_5O_{12}:Ce\ (z=0.4)$ | $(Lu_{1-x}Y_x)_3Al_5O_{12}:Ce\ (x=0.3)$ | | 106% |
| EXAMPLE 4 | $Y_3Al_5O_{12}:Ce$ | $(Lu_{1-x}Y_x)_3Al_5O_{12}:Ce\ (x=0.2)$ | | 103% |
| COMPARATIVE EXAMPLE | $Y_3Al_5O_{12}:Ce$ | $Lu_3Al_5O_{12}:Ce$ | | 103% |

FIG. 10B

| CATEGORY | ANGLE OF PHOSPHOR | | |
|---|---|---|---|
| | FIRST PHOSPHOR | SECOND PHOSPHOR | THIRD PHOSPHOR |
| EXAMPLE 1 | 61° | 65° | 54° |
| EXAMPLE 2 | 61° | 65° | 54° |
| EXAMPLE 3 | 115° | 65° | |
| EXAMPLE 4 | 115° | 65° | |
| COMPARATIVE EXAMPLE | 115° | 65° | |

IMAGE PROJECTION DEVICE

CROSS-REFERENCE TO RELATED APPLICATION(S)

This application is the National Stage filing under 35 U.S.C. 371 of International Application No. PCT/KR2021/008918, filed on Jul. 12, 2021, which claims the benefit of earlier filing date and right of priority to Korean Application No. 10-2021-0085735, filed on Jun. 30, 2021, the contents of which are all hereby incorporated by reference herein in their entireties.

BACKGROUND

1. Field

The present disclosure relates to an image projection apparatus, and more particularly to an image projection apparatus capable of providing highly efficient light output and improving color purity.

2. Description of the Related Art

An image projection apparatus is an apparatus that projects an image. Particularly, the image projection apparatus may project an image on a screen and the like.

The image projection apparatus may output light of a plurality of colors by using a phosphor wheel coated with phosphors.

Meanwhile, with an increase in image resolution, there is a growing demand for highly efficient light output during image projection.

In order to provide highly efficient light output, temperature tends to increase, causing a problem in that luminous efficiency of a phosphor decreases as the temperature increases.

In order to solve the above problem, it is required to provide a heat dissipation structure for preventing the temperature increase or to form a phosphor layer having high luminous efficiency despite the temperature increase.

SUMMARY

It is an object of the present disclosure to provide an image projection apparatus capable of providing highly efficient light output and improving color purity.

Meanwhile, it is another object of the present disclosure to provide an image projection apparatus capable of providing highly efficient light output and improving color purity despite a temperature increase.

In order to achieve the above and other objectives, an image projection apparatus according to an embodiment of the present disclosure includes: a light source configured to output blue light; and a phosphor wheel configured to output a plurality of colors of light based on the blue light incident upon rotation, wherein the phosphor wheel includes: a substrate; a yellow phosphor disposed in a first region on the substrate for output of yellow light; and a green phosphor disposed in a second region on the substrate for output of green light, wherein the green phosphor includes $(Lu_{1-x}Y_x)_3Al_5O_{12}$, with $0<x<0.8$.

Meanwhile, the green phosphor may include $(Lu_{1-x}Y_x)_3Al_5O_{12}$:Ce (LuYAG), with $0<x<0.8$.

Meanwhile, the green phosphor may include $(Lu,Y)_3Al_5O_{12}$:Ce (LuYAG).

Meanwhile, the yellow phosphor may include $Y_3(Al_{1-y}, Gd_y)_5O_{12}$:Ce, with $0<y\leq0.5$.

Meanwhile, a size of the first region may be greater than a size of the second region.

Meanwhile, the image projection apparatus according to an embodiment of the present disclosure may further include a color filter placed behind an output end of the phosphor wheel, and sequentially output the yellow light, the green light, and red light upon rotation.

Meanwhile, the color filter may further output blue light.

Meanwhile, the color filter may include: a yellow region for output of the yellow light; a green region for output of the green light; a red region for output of the red light; and a blue region for output of the blue light.

Meanwhile, a size of the yellow region or the blue region may be less than a size of the red region or the green region.

Meanwhile, the phosphor wheel may further include a reflective layer disposed between the substrate and the yellow phosphor or the green phosphor.

Meanwhile, the phosphor wheel may further include a red phosphor disposed in a third region on the substrate for output of red light, wherein the red phosphor may include $Y(Al_{1-z},Ga_z)_5O_{12}$:Ce, with $0<z\leq0.8$.

An image projection apparatus according to another embodiment of the present disclosure includes: a light source configured to output blue light; and a phosphor wheel configured to output a plurality of colors of light based on the blue light incident upon rotation, wherein the phosphor wheel includes: a substrate; a yellow phosphor disposed in a first region on the substrate for output of yellow light; and a green phosphor disposed in a second region on the substrate for output of green light; and a red phosphor disposed in a third region on the substrate for output of red light, wherein the green phosphor includes $(Lu_{1-x}Y_x)_3Al_5O_{12}$:Ce, with $0<x<0.8$.

Meanwhile, the yellow phosphor may include $Y_3(Al_{1-y}, Gd_y)_5O_{12}$:Ce, with $0<y\leq0.5$, and the red phosphor may include $Y(Al_{1-z}, Ga_z)_5O_{12}$:Ce, with $0<z\leq0.8$.

Meanwhile, a size of the first region may be greater than a size of the third region, and the size of the third region may be less than a size of the second region.

Meanwhile, the image projection apparatus may further include a color filter placed behind an output end of the phosphor wheel, and to sequentially output the yellow light, the green light, the red light, and the blue light upon rotation.

Meanwhile, the phosphor wheel may further include a reflective layer disposed between the substrate and the yellow phosphor or the green phosphor or the red phosphor.

EFFECTS OF THE DISCLOSURE

An image projection apparatus according to an embodiment of the present disclosure includes: a light source configured to output blue light; and a phosphor wheel configured to output a plurality of colors of light based on the blue light incident upon rotation, wherein the phosphor wheel includes: a substrate; a yellow phosphor disposed in a first region on the substrate for output of yellow light; and a green phosphor disposed in a second region on the substrate for output of green light, wherein the green phosphor includes $(Lu_{1-x}Y_x)_3Al_5O_{12}$, with $0<x<0.8$. Accordingly, highly efficient light output may be provided, and color purity may be improved. Particularly, highly efficient light output may be provided and color purity may be improved despite a temperature increase.

Meanwhile, the green phosphor may include $(Lu_{1-x}Y_x)_3Al_5O_{12}$:Ce (LuYAG), with 0<x<0.8. Accordingly, highly efficient light output may be provided, and color purity may be improved.

Meanwhile, the green phosphor may include $(Lu,Y)_3Al_5O_{12}$:Ce (LuYAG). Accordingly, highly efficient light output may be provided, and color purity may be improved.

Meanwhile, the yellow phosphor may include $Y_3(Al_{1-y}, Gd_y)_5O_{12}$:Ce, with 0<y≤0.5. Accordingly, highly efficient light output may be provided, and color purity may be improved.

Meanwhile, a size of the first region may be greater than a size of the second region. Accordingly, highly efficient light output may be provided, and color purity may be improved.

Meanwhile, the image projection apparatus according to an embodiment of the present disclosure may further include a color filter placed behind an output end of the phosphor wheel, and sequentially output the yellow light, the green light, and red light upon rotation. Accordingly, highly efficient light output may be provided, and color purity may be improved.

Meanwhile, the color filter may further output blue light. Accordingly, highly efficient light output may be provided, and color purity may be improved.

Meanwhile, the color filter may include: a yellow region for output of the yellow light; a green region for output of the green light; a red region for output of the red light; and a blue region for output of the blue light. Accordingly, highly efficient light output may be provided, and color purity may be improved.

Meanwhile, a size of the yellow region or the blue region may be less than a size of the red region or the green region. Accordingly, highly efficient light output may be provided, and color purity may be improved.

Meanwhile, the phosphor wheel may further include a reflective layer disposed between the substrate and the yellow phosphor or the green phosphor. Accordingly, highly efficient light output may be provided, and color purity may be improved.

Meanwhile, the phosphor wheel may further include a red phosphor disposed in a third region on the substrate for output of red light, wherein the red phosphor may include $Y(Al_{1-z}, Ga_z)_5O_{12}$:Ce, with 0<z≤0.8. Accordingly, highly efficient light output may be provided, and color purity may be improved.

An image projection apparatus according to another embodiment of the present disclosure includes: a light source configured to output blue light; and a phosphor wheel configured to output a plurality of colors of light based on the blue light incident upon rotation, wherein the phosphor wheel includes: a substrate; a yellow phosphor disposed in a first region on the substrate for output of yellow light; and a green phosphor disposed in a second region on the substrate for output of green light; and a red phosphor disposed in a third region on the substrate for output of red light, wherein the green phosphor includes $(Lu_{1-x}Y_x)_3Al_5O_{12}$:Ce, with 0<x<0.8. Accordingly, highly efficient light output may be provided, and color purity may be improved. Particularly, highly efficient light output may be provided and color purity may be improved despite a temperature increase.

Meanwhile, the yellow phosphor may include $Y_3(Al_{1-y}, Gd_y)_5O_{12}$:Ce, with 0<y≤0.5, and the red phosphor may include $Y(Al_{1-z}, Ga_z)_5O_{12}$:Ce, with 0<z≤0.8. Accordingly, highly efficient light output may be provided, and color purity may be improved.

Meanwhile, a size of the first region may be greater than a size of the third region, and the size of the third region may be less than a size of the second region. Accordingly, highly efficient light output may be provided, and color purity may be improved.

Meanwhile, the image projection apparatus may further include a color filter placed behind an output end of the phosphor wheel, and to sequentially output the yellow light, the green light, the red light, and the blue light upon rotation. Accordingly, highly efficient light output may be provided, and color purity may be improved.

Meanwhile, the phosphor wheel may further include a reflective layer disposed between the substrate and the yellow phosphor or the green phosphor or the red phosphor. Accordingly, highly efficient light output may be provided, and color purity may be improved.

DETAILED DESCRIPTION OF THE PREFERRED EMBODIMENTS

Hereinafter, embodiments of the present disclosure will be described in detail with reference to the accompanying drawings.

The terms "module" and "unit," when attached to the names of components are used herein to help the understanding of the components and thus they should not be considered as having specific meanings or roles. Accordingly, the terms "module" and "unit" may be used interchangeably.

An optical device as described in this specification is a device that is capable of outputting a visible light. The optical device may be applied to an image projection apparatus. Alternatively, the optical device may also be applied to a lighting apparatus.

Meanwhile, an image projection apparatus as described in this specification is an apparatus that is capable of projecting an image to the outside. For example, the image projection apparatus may be a projector.

Meanwhile, the image projection apparatus as described in this specification may be mounted as a component in another apparatus. For example, the image projection apparatus may be mounted in a mobile terminal. Alternatively, the image projection apparatus may be mounted in an electric home appliance, such as an air conditioner, a refrigerator, a cooking apparatus, or a robot cleaner. Alternatively, the image projection apparatus may also be mounted in a vehicle, such as a car.

Hereinafter, the image projection apparatus will be described in detail.

Figure 1:
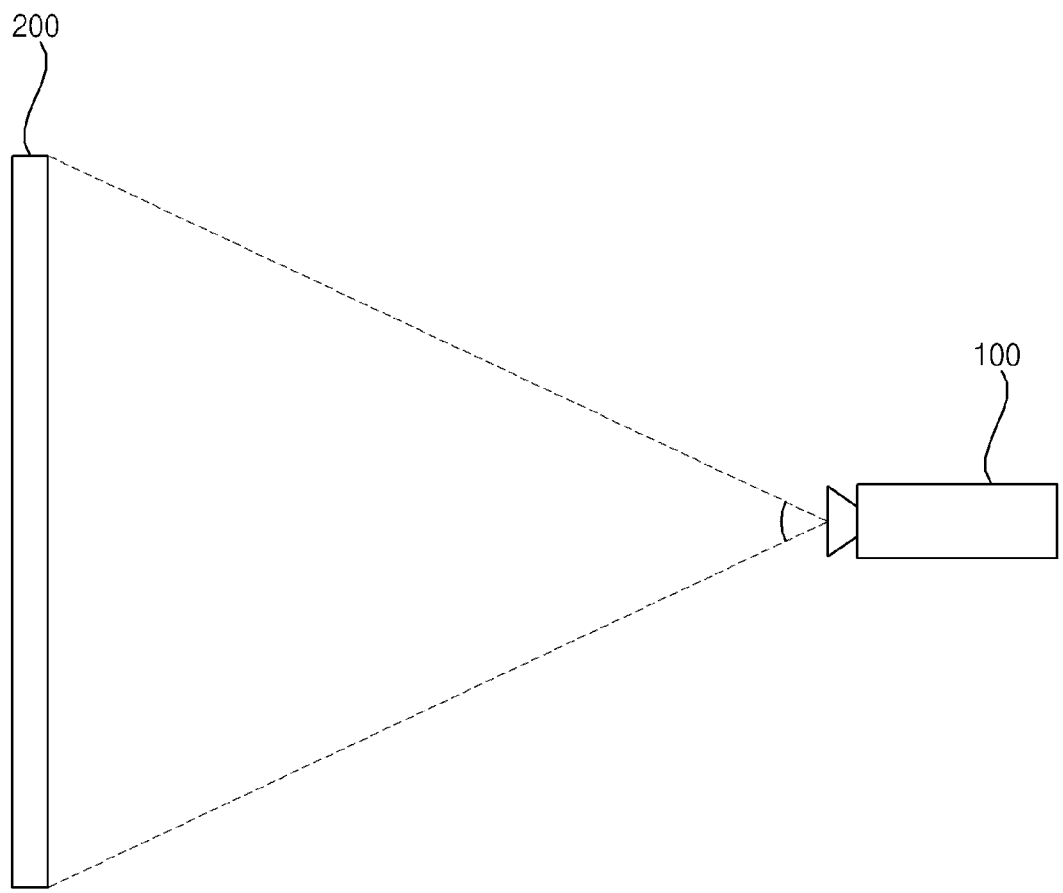
FIG. 1 is a diagram illustrating the exterior of an image projection apparatus according to an embodiment of the present disclosure.

FIG. 1 is a diagram illustrating the exterior of an image projection apparatus according to an embodiment of the present disclosure.

Referring to the drawing, an image projection apparatus 100 may project an image on a screen 200.

In the drawing, an example is illustrated in which the screen 200 has a flat surface but may also have a curved surface.

A user may view the image projected on the screen 200.

Figure 2:
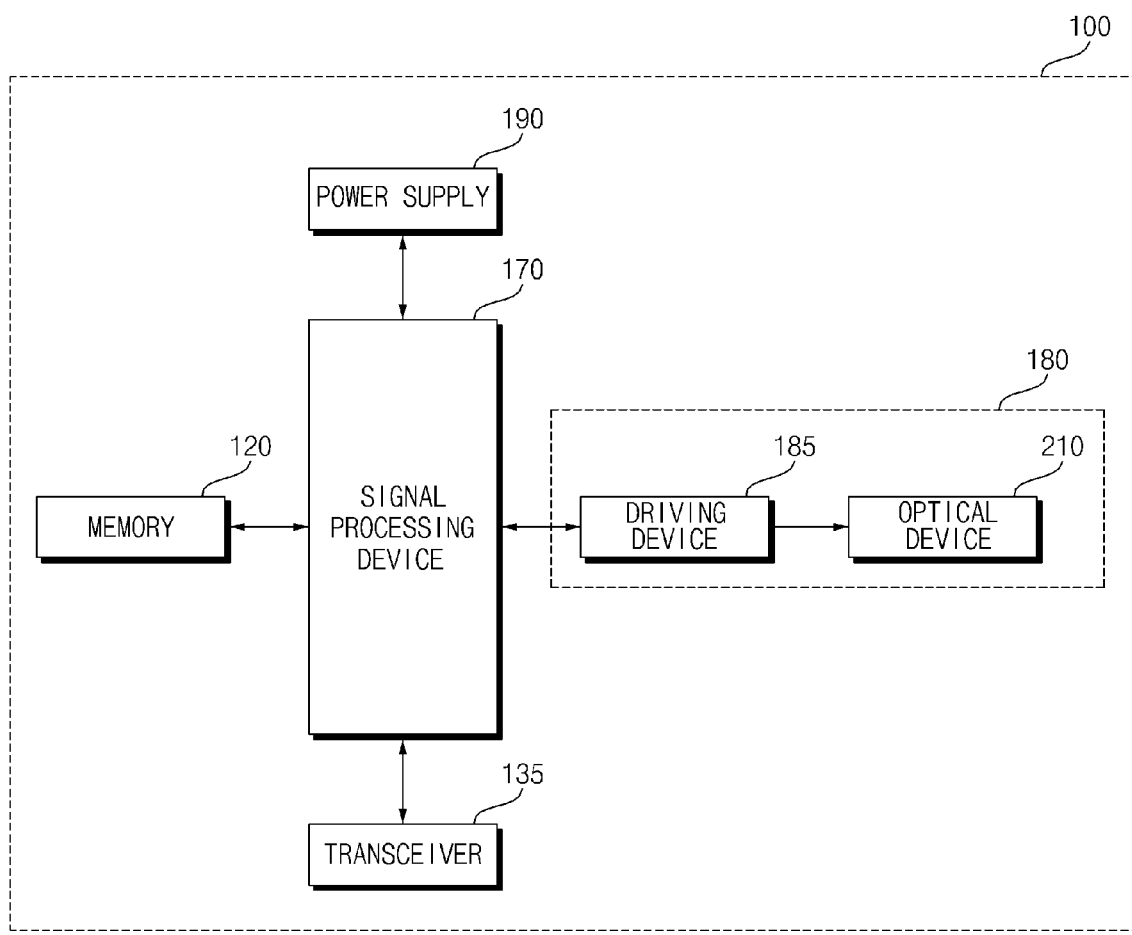
FIG. 2 is an exemplary internal block diagram of the image projection apparatus of FIG. 1.

FIG. 2 is an exemplary internal block diagram of the image projection apparatus of FIG. 1.

Referring to the drawing, the image projection apparatus 100 may include a memory 120, a signal processing device 170, a transceiver 135, an image output device 180, and a power supply 190.

Meanwhile, the image output device 180 may include a driving device 185 and an optical device 210.

The driving device 185 may drive the optical device 210, particularly a light source mounted in the optical device 210.

The optical device 210 may include optical elements, such as a light source and a lens, for light output, particularly visible light output.

Particularly, in this embodiment of the present disclosure, there is provided an optical device capable of providing highly efficient light output and improving color purity, which will be described in detail with reference to FIG. 4 and subsequent figures.

The memory 120 may store programs for processing and control by the signal processing device 170 and may temporarily store input and output data (e.g., still and moving image, etc.).

The transceiver 135 functions as an interface with all external devices connected by wire or wirelessly to the image projection apparatus 100 or a network. The transceiver 135 may transmit data or power, received from the external devices, to each component in the image projection apparatus 100, and may transmit data from the image projection apparatus 100 to the external devices.

Particularly, the transceiver 135 may receive a wireless signal from an adjacent mobile terminal (not shown). Here, the wireless signal may include a voice call signal, a video communication call signal, or various types of data, such as text data and image data, and the like.

To this end, the transceiver 135 may include a short range communication module (not shown). Bluetooth, radio frequency identification (RFID), infrared data association (IrDA), ultra wideband (UWB), ZigBee, or near field communication (NFC) may be used as short range communication technology.

The signal processing device 170 may control the overall operation of the image projection apparatus 100. Specifically, the signal processing device 170 may control the operation of each unit in the image projection apparatus 100.

The signal processing device 170 may control video images stored in the memory 120 or video images received from an external source through the transceiver 135 to be projected to the outside as projected images.

To this end, the signal processing device 170 may control the driving device 185 for controlling the optical device 210 that outputs a visible light including red (R), green (G), and blue (B) lights. Specifically, R, G, and B signals corresponding to a video to be displayed may be output to the driving device 185.

The power supply 190 may supply external power or internal power to the respective components under the control of the signal processing device 170.

The power supply 190 may supply power to the image projection apparatus 100. Particularly, the power supply 190 may supply power to the image projection apparatus 100 which may be implemented in the form of a system-on-chip (SoC), the image display device 180 for displaying images, and an audio output device (not shown) for audio output.

Figure 3:
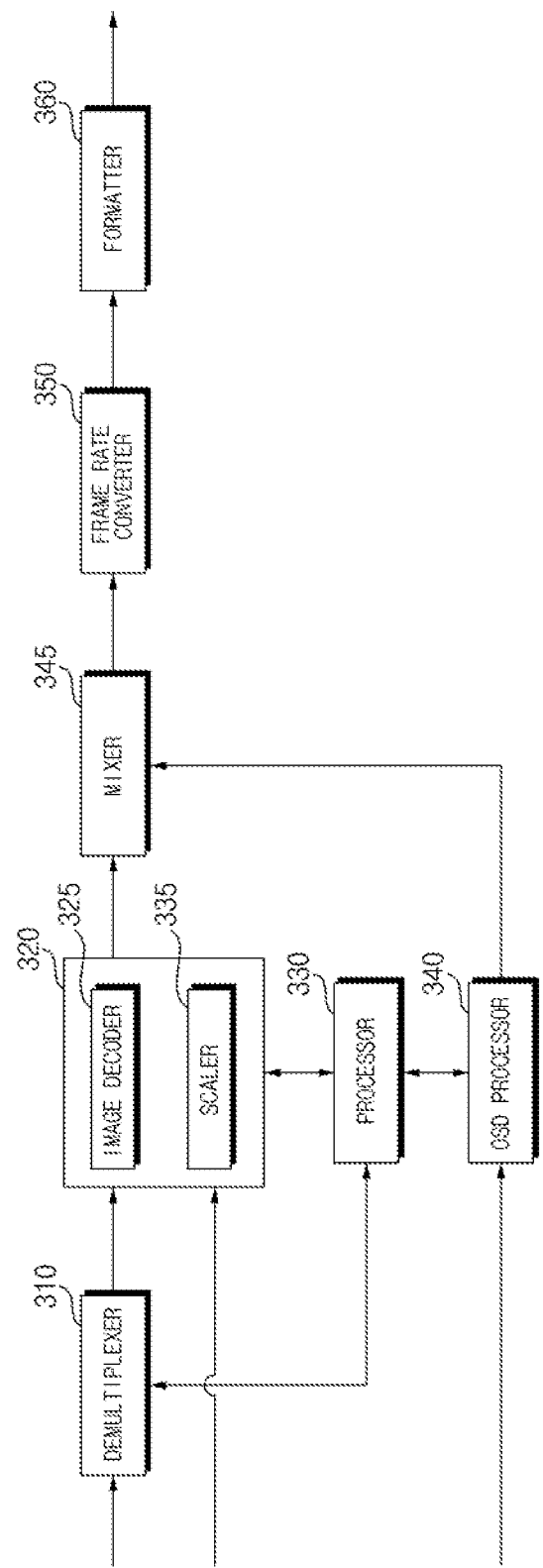
FIG. 3 is an exemplary internal block diagram of a signal processing device of FIG. 2.

FIG. 3 is an internal block diagram of a controller of FIG. 2.

Referring to the drawing, the signal processing device 170 according to an embodiment of the present disclosure may include a multiplexer 310, an image processor 320, a processor 330, an OSD generator 340, a mixer 345, a frame rate converter 350, and a formatter 360. In addition, the signal processing device 170 may further include an audio processing device (not shown) and a data processing device (not shown).

The demultiplexer 310 may demultiplex an input stream.

The image processor 320 may perform image processing on the demultiplexed image signal. To this end, the image processor 320 may include an image decoder 225 and a scaler 235.

The image decoder 225 may decode the demultiplexed image signal, and the scaler 235 performs scaling so that the resolution of the decoded image signal may be output from the image output device 180. The image decoder 225 may include a decoder of various standards.

The processor 330 may control the overall operation of the image projection apparatus 100 or the signal processing device 170. In addition, the processor 330 may control the operation of demultiplexer 310, the image processor 320, the OSD generator 340, and the like.

The OSD generator 340 generate an OSD signal according to a user input or by itself.

The mixer 345 may mix the OSD signal, generated by the OSD generator 340, with the decoded image signal processed by the image processor 320. The mixed image signal may be provided to the frame rate converter 350.

The frame rate converter (FRC) 350 may convert a frame rate of an input image. Meanwhile, the frame rate converter 350 may output the image as it is without separate conversion of its frame rate.

Meanwhile, the formatter 360 may receive the signal mixed by the mixer 345, i.e., the OSD signal and the decoded image signal, and may perform signal conversion to input the signal to the image output device 180. For example, the formatter 360 may output a low voltage differential signal (LVDS).

Meanwhile, the block diagram of the signal processing device 170 illustrated in FIG. 3 is a block diagram for an embodiment of the present disclosure. Each component of the block diagram may be integrated, added, or omitted according to a specification of the signal processing device 170 actually implemented.

Particularly, the frame rate converter 350 and the formatter 360 may not be provided in the signal processing device 170 but may be separately provided, or may be provided as a single module.

Figure 4:
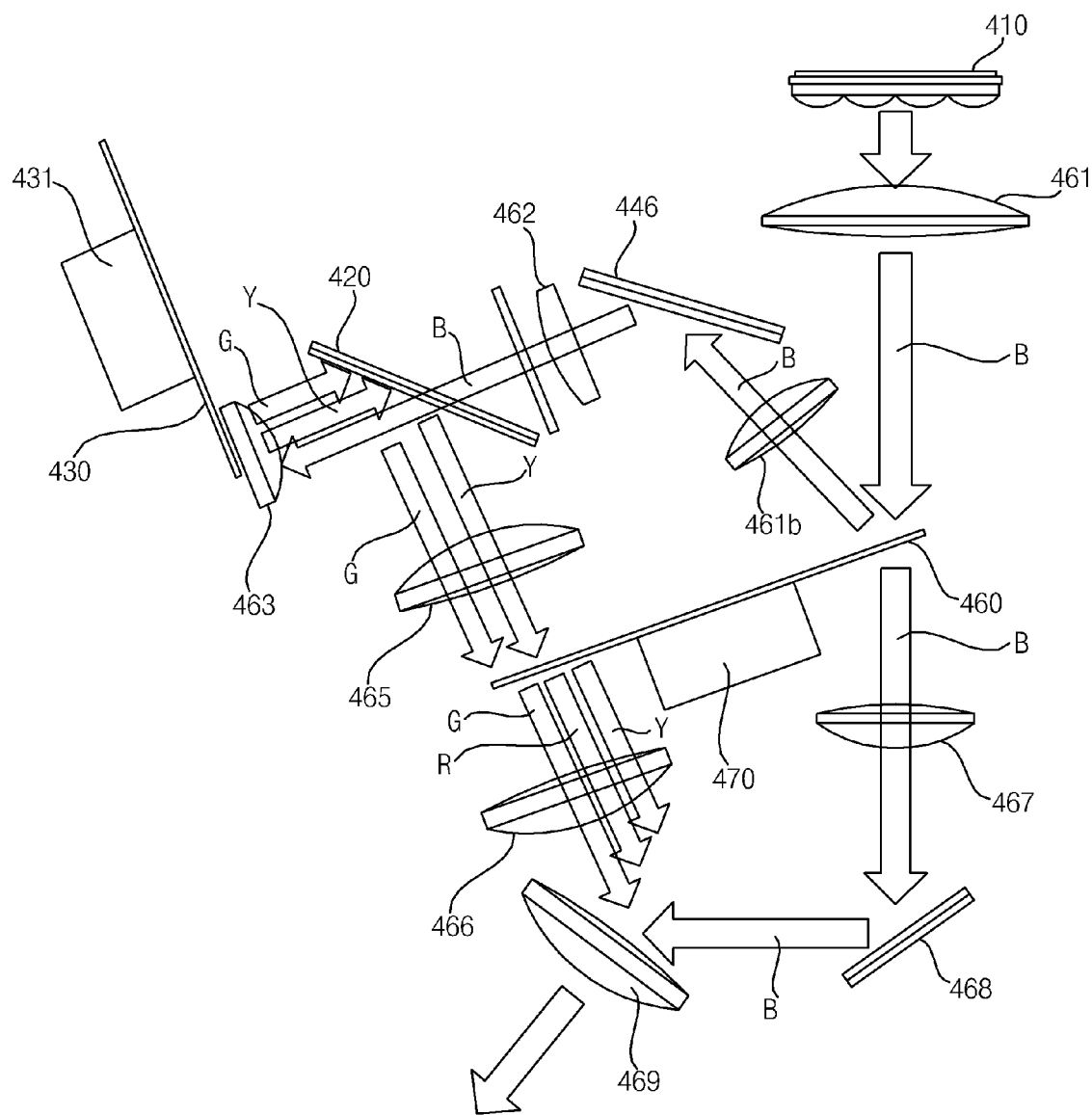
FIG. 4 is a diagram illustrating an example of a structure of an optical device of FIG. 2.

FIG. 4 is a diagram illustrating an example of a structure of the optical device of FIG. 2.

Referring to the drawing, an optical device 210a according to an embodiment of the present disclosure includes a light source 410 configured to output blue light B, and a phosphor wheel 430 which is rotated to output a plurality of colors of light based on the blue light B incident upon rotation.

Meanwhile, the light source 410 for outputting the blue light B may include a laser diode and the like. For example, the laser diode 410 may output a blue laser beam B.

The blue light B output by the light source 410 may be collected through a collimator lens 461, to be incident on the color filter 460.

The optical device 210a according to an embodiment of the present disclosure may further include the color filter 460 which is placed behind an output end of the phosphor wheel 430, and is rotated to sequentially output yellow light Y, green light G, and red light R.

For example, the color filter 460 may include a yellow region ARa for the output of yellow light Y, a green region ARb for the output of green light G, a red region ARc for the output of red light R, and a blue region ARd for the output of the blue light B.

If the blue light B emitted from the light source 410 is incident on the yellow region ARa, the green region ARb, or the red region Arc for the output of the red light R, the color filter 460 reflects the blue light B.

The blue light B reflected by the color filter 460 may pass through a collimator lens 461b to be incident on a first reflective mirror 446.

The first reflective mirror 446 reflects the incident blue light B, and the blue light B reflected by the first reflective mirror 446 passes through a collimator lens 462 to be incident on a beam splitter 420.

The beam splitter 420 transmits the incident blue light B, and reflects the remaining yellow light Y, green light G, or the red light R.

The blue light B, transmitted through the beam splitter 420, passes through a collimator lens 463 to be incident on the phosphor wheel 430.

The phosphor wheel 430 is rotated to output a plurality of colors of light based on the blue light B incident upon rotation.

Specifically, the phosphor wheel 430 includes a yellow phosphor PHY for the output of yellow light Y and a green phosphor PHG for the output of green light G.

If the blue light B is incident on the yellow phosphor PHY in the phosphor wheel 430, the phosphor wheel 430 reflects and outputs the yellow light Y.

Meanwhile, if the blue light B is incident on the green phosphor PHG in the phosphor wheel 430, the phosphor wheel 430 reflects and outputs the green light G.

The yellow light Y and the green light G, which are sequentially output by the phosphor wheel 430, are incident on the beam splitter 420, and the beam splitter 420 reflects the yellow light Y and the green light G.

The yellow light Y and the green light G, which are reflected by the beam splitter 420, are incident on the color filter 460.

If the yellow light Y reflected by the beam splitter 420 is incident on the yellow region ARa of the color filter 460, the color filter 460 transmits and outputs the yellow light Y.

If the green light G reflected by the beam splitter 420 is incident on the green region ARb of the color filter 460, the color filter 460 transmits and outputs the green light G.

If the yellow light Y or the green light G, reflected by the beam splitter 420, is incident on the red region ARc of the color filter 460, the color filter 460 transmits and outputs the red light R.

The yellow light Y, the green light G, and the red light R from the color filter 460 are output in a first direction by a collimator lens 469.

Meanwhile, the blue light B transmitted through the phosphor wheel 430 passes through a second reflective mirror 468 to be output in the first direction by the collimator lens 463.

Accordingly, the yellow light Y, the green light G, the red light R, and the blue light B are sequentially output in the first direction.

Meanwhile, the phosphor wheel 430 according to an embodiment of the present disclosure includes the green phosphor PHG for the output of green light G, and the green phosphor PHG includes $(Lu_{1-x}Y_x)_3Al_5O_{12}$, in which it is preferable that $0<x<0.8$.

Particularly, the phosphor wheel 430 according to an embodiment of the present disclosure includes the green phosphor PHG for the output of green light G, and the green phosphor PHG includes $(Lu_{1-x}Y_x)_3Al_5O_{12}$:Ce, in which it is preferable that $0<x<0.8$.

Instead of LuAG:Ce, $(Lu_{1-x}Y_x)_3Al_5O_{12}$:Ce may be used as the green phosphor PHG, thereby providing highly efficient light output and improving color purity despite a temperature increase. In addition, highly efficient light output may be provided and color purity may be improved, which will be described in further detail with reference to FIG. 5A and subsequent figures.

Figure 5A:
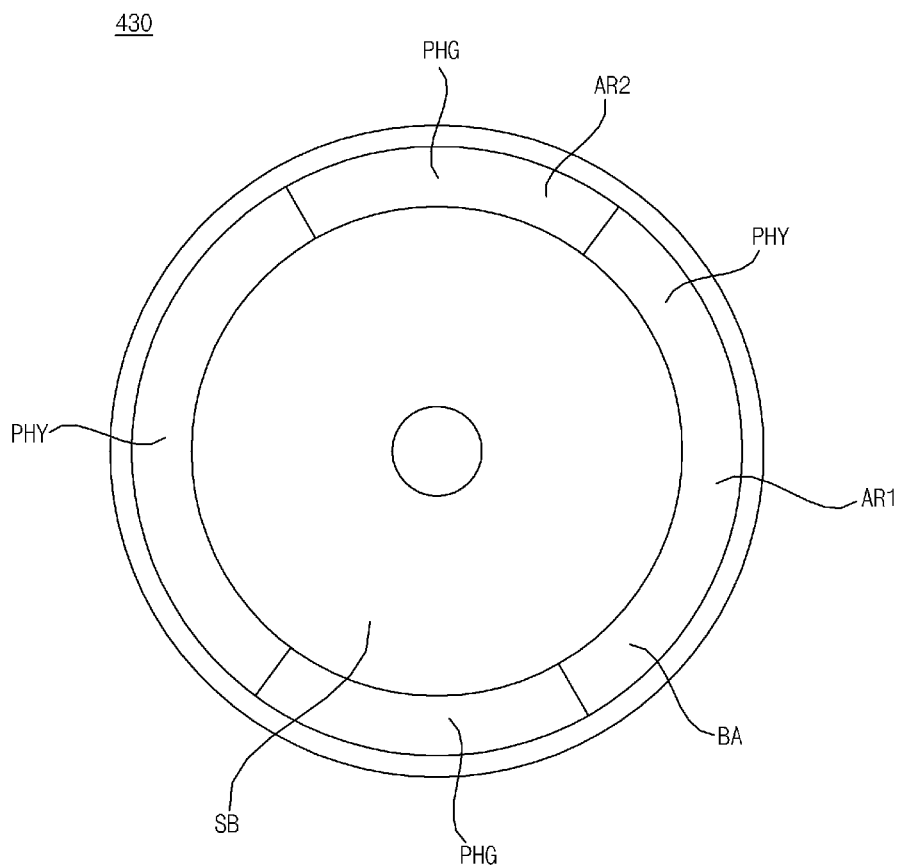
FIGS. 5A to 6 are diagrams referred to in the description of FIG. 4.
Figure 5B:
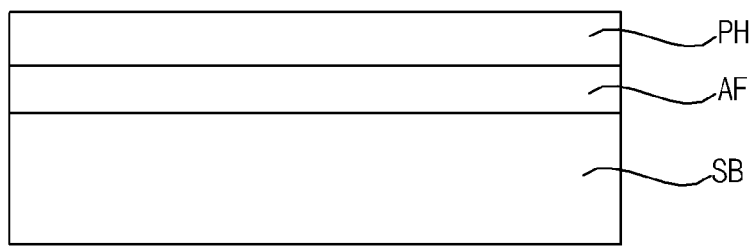
Figure 5C:
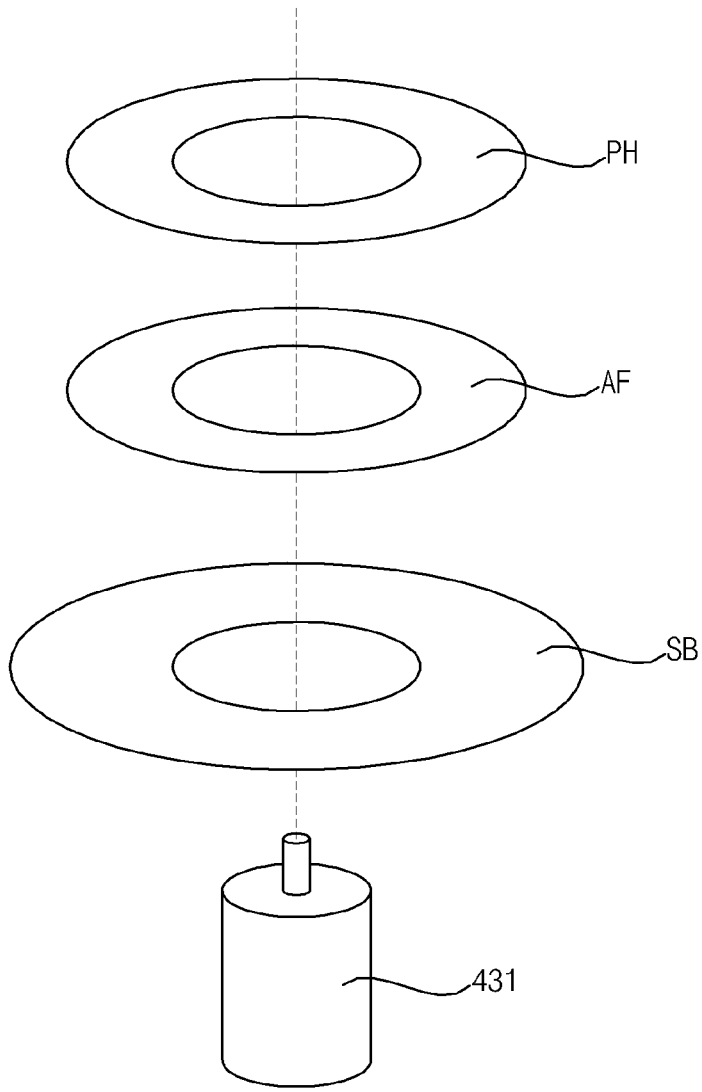
Figure 6:
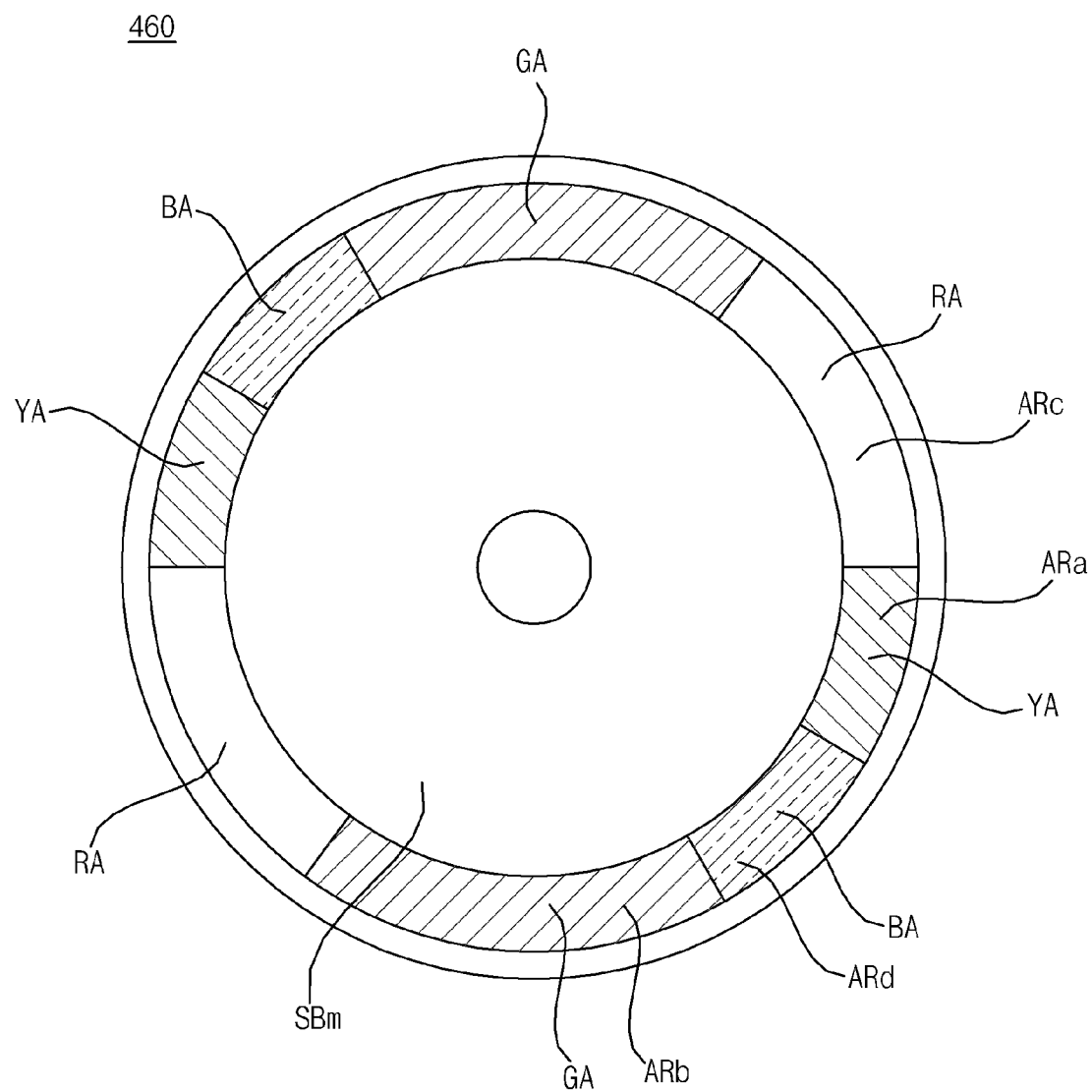

FIGS. 5A to 6 are diagrams referred to in the description of FIG. 4.

FIG. 5A is an exemplary top view of the phosphor wheel of FIG. 4, FIG. 5B is an exemplary side view of the phosphor wheel of FIG. 4, and FIG. 5C is an exemplary exploded view of the phosphor wheel of FIG. 4.

Referring to the drawings, the phosphor wheel 430 includes a substrate SB, a yellow phosphor PHY for the output of yellow light Y which is disposed in a first region AR1 on the substrate SB, and a green phosphor PHG for the output of green light G which is disposed in a second region AR2 on the substrate SB.

The substrate SB may include, for example, an aluminum (Al) substrate.

Meanwhile, the phosphor wheel 430 may further include a reflective layer AF disposed between the substrate SB and the yellow phosphor PHY or the green phosphor PHG. By using the reflective layer AF, highly efficient light output may be provided and color purity may be improved when the yellow light or green light is output from the yellow phosphor PHY or the green phosphor PHG.

Meanwhile, the reflective layer AF may include TiO2 power and resin, or may include Ag deposited on the substrate SB.

Meanwhile, the phosphor wheel 430 may be rotated by a wheel motor 431.

Meanwhile, the green phosphor PHG includes $(Lu_{1-x}Y_x)_3Al_5O_{12}$, in which it is preferable that $0<x<0.8$. Accordingly, highly efficient light output may be provided, and color purity may be improved. Particularly, highly efficient light output may be provided and color purity may be improved despite a temperature increase.

Particularly, the green phosphor PHG includes $(Lu_{1-x}Y_x)_3Al_5O_{12}$:Ce (LuYAG), with $0<x<0.8$. Accordingly, highly efficient light output may be provided, and color purity may be improved.

Meanwhile, the green phosphor PHG may include (Lu, Y)$_3$Al$_5$O$_{12}$:Ce (LuYAG). Accordingly, highly efficient light output may be provided, and color purity may be improved.

Meanwhile, the yellow phosphor PHY includes $Y_3(Al_{1-y}Gd_y)_5O_{12}$:Ce, with $0<y\leq0.5$. Accordingly, highly efficient light output may be provided, and color purity may be improved.

Particularly, the yellow phosphor PHY may include $Y_3(Al,Ga)_5O_{12}$:Ce (Ga-YAG). Accordingly, highly efficient light output may be provided, and color purity may be improved.

Meanwhile, a size of the first region AR1 is preferably greater than a size of the second region AR2. That is, a size of the first region AR1, coated with the green phosphor PHG, is preferably greater than a size of the second region AR2 coated with the yellow phosphor PHY. Accordingly, highly efficient light output may be provided, and color purity may be improved.

Meanwhile, a phosphor layer PH applied on the phosphor wheel 430 is preferably a phosphor film or a ceramic phosphor, rather than a resin. Accordingly, high output is achieved even at a high temperature.

Meanwhile, a thickness of the phosphor layer PH applied on the phosphor wheel 430 is preferably greater than a thickness of the reflective layer AF and is preferably less than a thickness of the substrate SB.

FIG. 6 is an exemplary top view of the color filter of FIG. 4.

Referring to the drawing, the color filter 460 according to an embodiment of the present disclosure is placed behind an output end of the phosphor wheel 430, and is rotated to sequentially output the yellow light Y, the green light G, and the red light R.

Meanwhile, the color filter 460 according to an embodiment of the present disclosure is placed behind an output end of the phosphor wheel 430, and is rotated to sequentially output the yellow light Y, the green light G, the red light R, and the blue light B.

To this end, the color filter 460 may include a yellow region ARa for the output of yellow light Y, a green region ARb for the output of green light G, a red region ARc for the output of red light R, and a blue region ARd for the output of blue light B.

Meanwhile, a size of the yellow region Ara or the blue region Ard may be less than a size of the red region ARc or the green region ARb, as illustrated in FIG. 6. Accordingly, highly efficient light output may be provided, and color purity may be improved.

Particularly, FIG. 6 illustrates an example in which the blue region Ard has a smallest size, and then the yellow region ARa, the red region ARc, and the green region ARb sequentially increase in size. Accordingly, highly efficient light output may be provided, and color purity may be improved.

Figure 7:
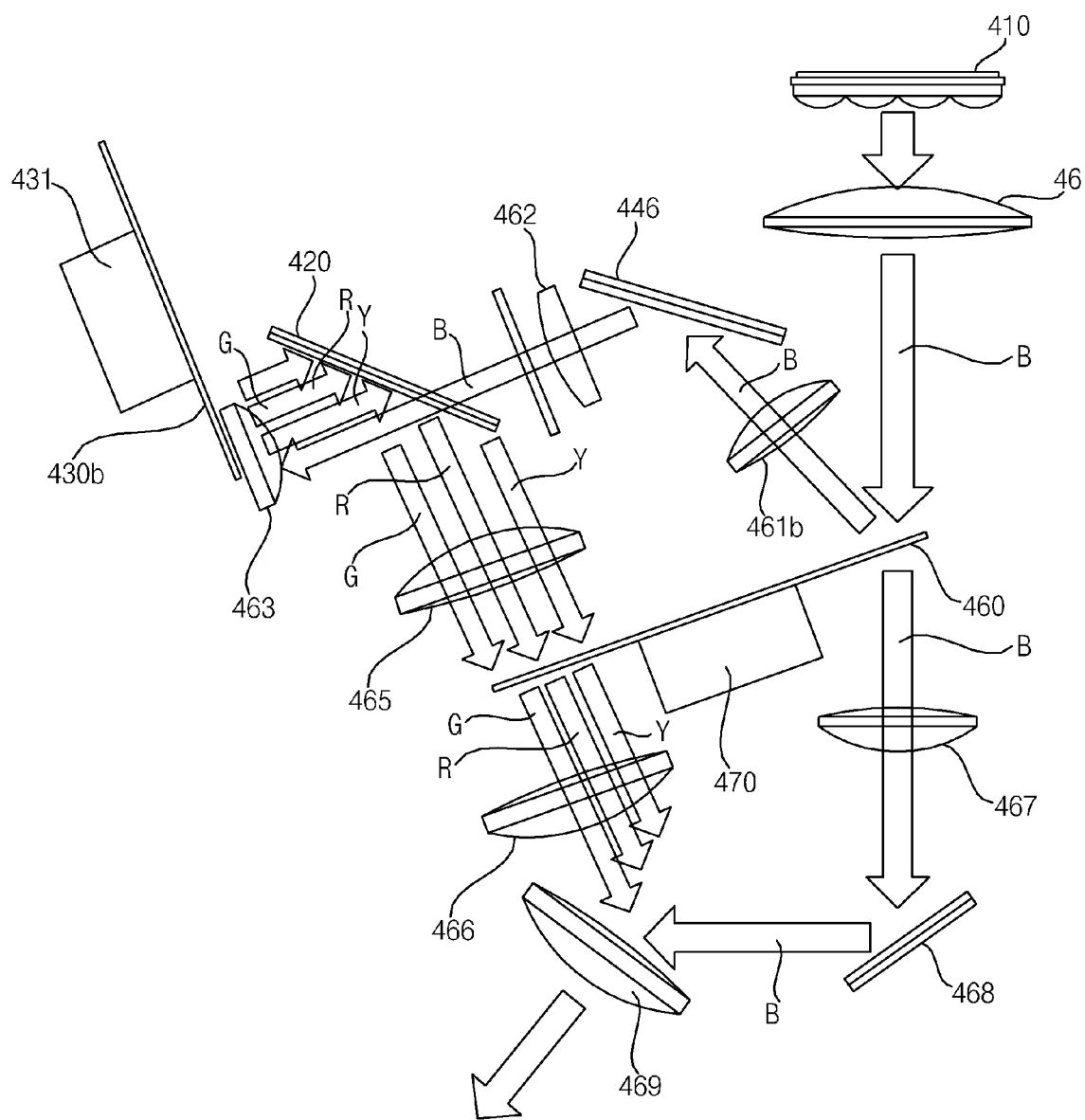
FIG. 7 is a diagram illustrating another example of a structure of an optical device of FIG. 2.

FIG. 7 is a diagram illustrating another example of a structure of the optical device of FIG. 2.

Referring to the drawing, an optical device 210*b* according to another embodiment of the present disclosure includes a light source 410 configured to output blue light B, and a phosphor wheel 430*b* which is rotated to output a plurality of colors of light based on blue light B incident upon rotation.

The optical device 210*b* of FIG. 7 is similar to the optical device 210 of FIG. 4, but is different in that the phosphor wheel 430*b* is further coated with the red phosphor PHR, in addition to the yellow phosphor PHY and the green phosphor PHG.

The following description will focus on the difference, and an omitted portion will be replaced with the description of FIG. 4.

The phosphor wheel 430*b* according to another embodiment of the present disclosure includes a substrate SB, a yellow phosphor PHY for the output of yellow light Y which is disposed in a first region AR1*b* on the substrate SB, a green phosphor PHG for the output of green light G which is disposed in a second region AR2*b* on the substrate SB, and a red phosphor PHR for the output of red light R which is disposed in a third region AR3*b* on the substrate SB.

The green phosphor PHG includes $(Lu_{1-x}Y_x)_3Al_5O_{12}$, in which it is preferable that $0<x<0.8$. Meanwhile, the green phosphor PHG includes $(Lu_{1-x}Y_x)_3Al_5O_{12}$:Ce (LuYAG), with $0<x<0.8$. Particularly, the green phosphor PHG may include $(Lu,Y)_3Al_5O_{12}$:Ce (LuYAG).

Meanwhile, the yellow phosphor PHY includes $Y_3(Al_{1-y}, Gd_y)_5O_{12}$:Ce, with $0<y\leq0.5$. Particularly, the yellow phosphor PHY may include $Y_3(Al,Ga)_5O_{12}$:Ce (Ga-YAG).

Meanwhile, the red phosphor PHR includes $Y(Al_{1-z}, Ga_z)_5O_{12}$:Ce, with $0<z\leq0.8$. Particularly, the red phosphor PHR may include $Y_3(Al,Gd)_5O_{12}$:Ce (Gd-YAG). Accordingly, highly efficient light output may be provided, and color purity may be improved.

The phosphor wheel 430*b* is rotated to output a plurality of colors of light based on the blue light B incident upon rotation.

If the blue light B is incident on the yellow phosphor PHY in the phosphor wheel 430*b*, the phosphor wheel 430*b* reflects and outputs the yellow light Y.

Meanwhile, if the blue light B is incident on the green phosphor PHG in the phosphor wheel 430*b*, the phosphor wheel 430*b* reflects and outputs the green light G.

Meanwhile, if the blue light B is incident on the red phosphor PHR in the phosphor wheel 430*b*, the phosphor wheel 430*b* reflects and outputs the red light R.

The yellow light Y, the green light G, and the red light R, which are sequentially output by the phosphor wheel 430, are incident on the beam splitter 420, and the beam splitter 420 reflects the yellow light Y, the green light G, and the red light R.

The yellow light Y, the green light G, and the red light R, which are reflected by the beam splitter 420, are incident on the color filter 460.

If the yellow light Y, reflected by the beam splitter 420, is incident on the yellow region ARa of the color filter 460, the color filter 460 transmits and outputs the yellow light Y.

If the green light G reflected by the beam splitter 420 is incident on the green region ARb of the color filter 460, the color filter 460 transmits and outputs the green light G.

If the red light R reflected by the beam splitter 420 is incident on the red region ARc of the color filter 460, the color filter 460 transmits and outputs the red light R.

The yellow light Y, the green light G, and the red light R from the color filter 460 are output in a first direction by the collimator lens 469.

Meanwhile, the blue light B transmitted through the phosphor wheel 430 passes through the second reflective mirror 468 to be output in the first direction by the collimator lens 463.

Accordingly, the yellow light Y, the green light G, the red light R, and the blue light B are sequentially output in the first direction.

Figure 8A:
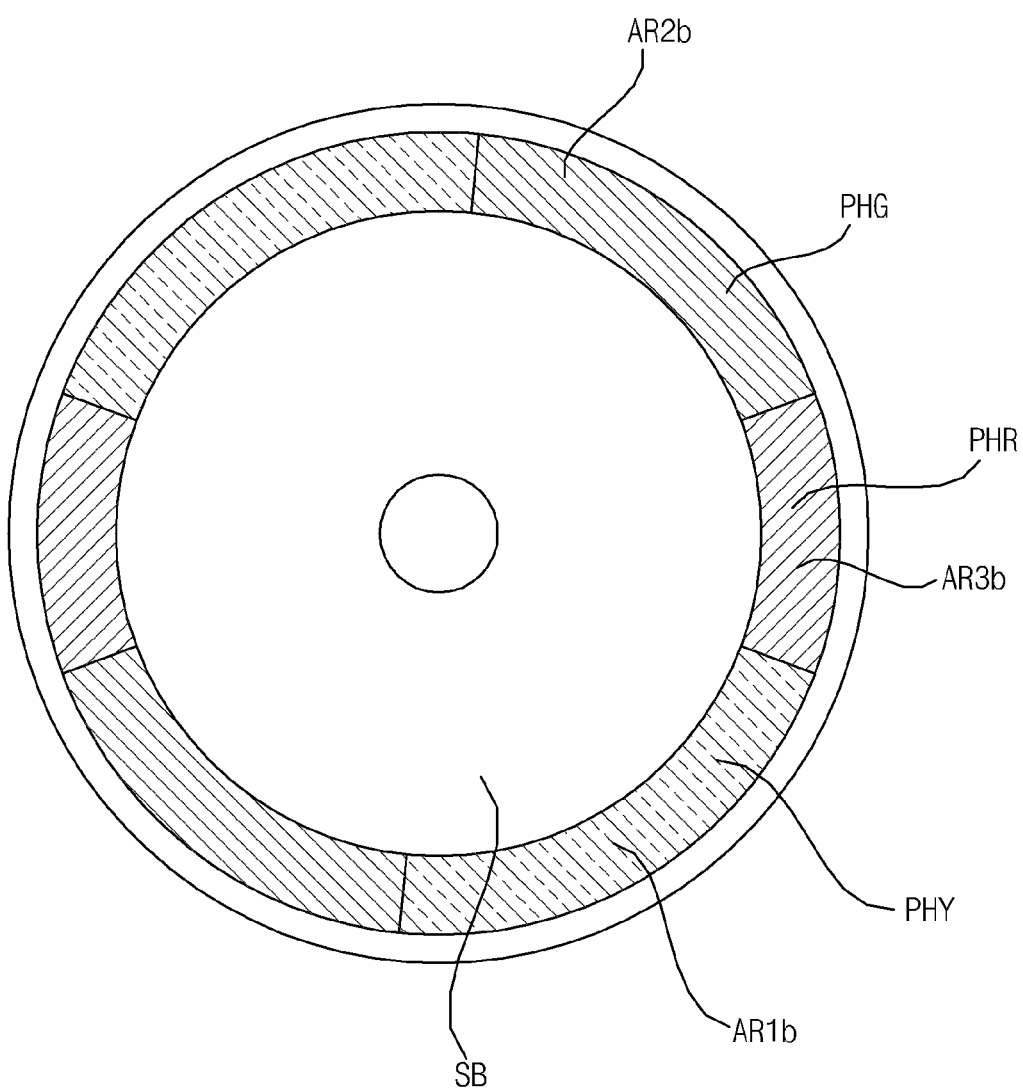
FIGS. 8A to 11 are diagrams referred to in the description of FIG. 7.
Figures 8B, 9A:
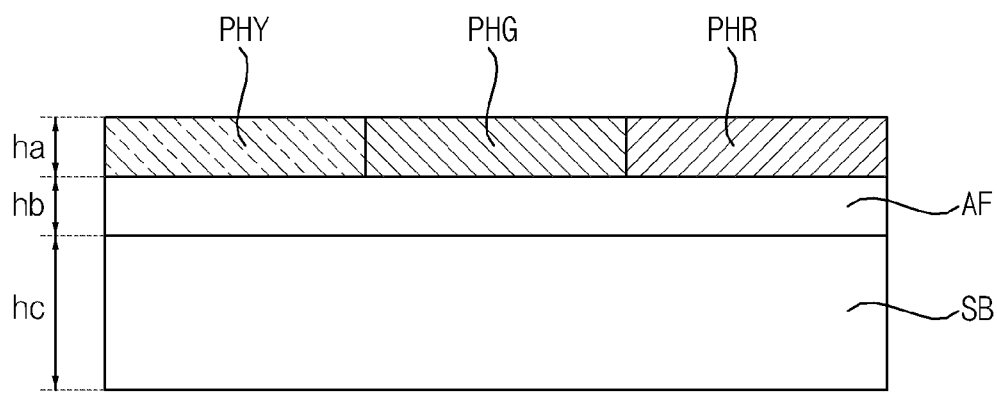

FIGS. 8A and 8B are diagrams referred to in the description of FIG. 7.

FIG. 8A is an exemplary top view of the phosphor wheel of FIG. 7, and FIG. 8B is an exemplary side view of the phosphor wheel of FIG. 7.

Referring to the drawings, the phosphor wheel 430*b* according to an embodiment of the present disclosure includes a substrate SB, a yellow phosphor PHY for the output of yellow light Y which is disposed in a first region AR1*b* on the substrate SB, a green phosphor PHG for the output of green light G which is disposed in a second region AR2b on the substrate SB, and a red phosphor PHR for the output of red light R which is disposed in a third region AR3b on the substrate SB.

Meanwhile, the phosphor wheel 430 may further include a reflective layer AF disposed between the substrate SB and the yellow phosphor PHY or the green phosphor PHG or the red phosphor PHR. By using the reflective layer AF, highly efficient light output may be provided and color purity may be improved when the yellow light or green light or red light is output from the yellow phosphor PHY or the green phosphor PHG or the red phosphor PHR.

Meanwhile, a size of the first region AR1b may be greater than a size of the third region AR3b, and a size of the third region Ar3b may be less than a size of the second region AR2b.

That is, it is preferable that a size of the first region AR1b coated with the yellow phosphor PHY is greater than a size of the third region Ar3b coated with the red phosphor PHR, and a size of the third region Ar3b coated with the red phosphor PHR is less than a size of the second region AR2 coated with the green phosphor PHG. Accordingly, highly efficient light output may be provided, and color purity may be improved.

Meanwhile, a phosphor layer PH applied on the phosphor wheel 430 is preferably a phosphor film or a ceramic phosphor, rather than a resin. Accordingly, high output is achieved even at a high temperature.

Meanwhile, a thickness of the phosphor layer PH applied on the phosphor wheel 430b is preferably greater than a thickness of the reflective layer AF and is preferably less than a thickness of the substrate SB.

FIGS. 9A to 10C are diagrams referred to in the description of FIGS. 4 to 8B.

First, FIG. 9A is a diagram referred to for explaining that the green phosphor PHG includes $(Lu_{1-x}Y_x)_3Al_5O_{12}$, in which it is preferable that $0<x<0.8$.

Referring to the drawing, results obtained through experimentation by changing the x-value show that a relative luminance is 100% when $x=0$ in $(Lu_{1-x}Y_x)_3Al_5O_{12}$, a relative luminance is 106% when $x=0.2$ in $(Lu_{1-x}Y_x)_3Al_5O_{12}$, a relative luminance is 107% when $x=0.3$ in $(Lu_{1-x}Y_x)_3Al_5O_{12}$, a relative luminance is 106% when $x=0.5$ in $(Lu_{1-x}Y_x)_3Al_5O_{12}$, and a relative luminance is 100% when $x=0.8$ in $(Lu_{1-x}Y_x)_3Al_5O_{12}$.

Accordingly, the green phosphor PHG includes $(Lu_{1-x}Y_x)_3Al_5O_{12}$, in which it is preferable that $0<x<0.8$.

Meanwhile, the relative luminance of FIG. 9A may be a relative luminance compared to $Lu_3Al_5O_{12}$:Ce.

Then, FIG. 9B is a diagram referred to for explaining that the red phosphor PHR includes $Y(Al_{1-z},Ga_z)_5O_{12}$:Ce, with $0<x<0.8$.

Referring to the drawing, results obtained through experimentation by changing the z-value show that a relative luminance is 100% when $z=0$ in $Y(Al_{1-z},Ga_z)_5O_{12}$:Ce, a relative luminance is 105% when $z=0.4$ in $Y(Al_{1-z},Ga_z)_5O_{12}$:Ce, a relative luminance is 105% when $z=0.6$ in $(Lu_{1-x}Y_x)_3Al_5O_{12}$, and a relative luminance is 101% when $z=0.8$ in $Y(Al_{1-z},Ga_z)_5O_{12}$:Ce.

Accordingly, the red phosphor PHR includes $Y(Al_{1-z},Ga_z)_5O_{12}$:Ce, in which it is preferable that $0<z\leq0.8$.

Next, FIG. 9C is a diagram referred to for explaining that the yellow phosphor PHY includes $Y_3(Al_{1-y},Gd_y)_5O_{12}$:Ce, with $0<y\leq0.5$.

Referring to the drawing, results obtained through experimentation by changing the y-value show that a relative luminance is 100% when $y=0$ in $Y_3(Al_{1-y},Gd_y)_5O_{12}$:Ce, a relative luminance is 102% when $y=0.2$ in $Y_3(Al_{1-y},Gd_y)_5O_{12}$:Ce, a relative luminance is 101% when $y=0.5$ in $Y_3(Al_{1-y},Gd_y)_5O_{12}$:Ce, and a relative luminance is 94% when $y=0.8$ in $Y_3(Al_{1-y},Gd_y)_5O_{12}$:Ce.

Accordingly, the yellow phosphor PHY includes $Y_3(Al_{1-y},Gd_y)_5O_{12}$:Ce, in which it is preferable that $0<y\leq0.5$.

Meanwhile, the relative luminance of FIG. 9C may be a relative luminance compared to $Y_3Al_5O_{12}$:Ce.

Figures 9D, 9E:
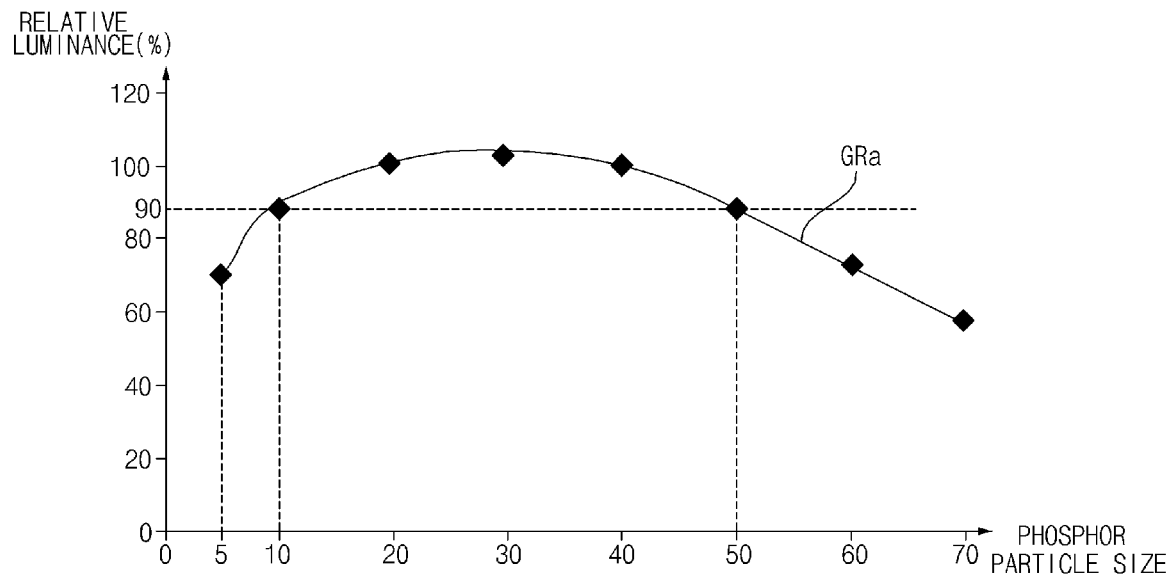

FIG. 9D is a diagram illustrating a relationship between a phosphor particle size and a relative luminance.

Referring to the drawing, a graph Gra shows a relationship between a phosphor particle size and a relative luminance.

The graph Gra shows a relative luminance of 90% or more when a phosphor particle size is between 10 um and 50 um.

Accordingly, the phosphor layer PH applied on the phosphor wheel 430 preferably has an average particle size of 10 um to 50 um.

Meanwhile, FIG. 9E is a diagram illustrating a relationship between a thickness of the phosphor layer PH applied on the phosphor wheel 430 and a relative luminance.

Referring to the drawing, a relative luminance is 100% when a thickness of the phosphor layer PH applied on the phosphor wheel 430 is 20 um, but there is a drawback in that adhesion is weak due to a small thickness.

Meanwhile, the experiment shows that a relative luminance is 107% when a thickness of the phosphor layer PH applied on the phosphor wheel 430 is 50 um, a relative luminance is 107% when the thickness is 100 um, a relative luminance is 103% when the thickness is 200 um, a relative luminance is 99% when the thickness is 300 um, and a relative luminance is 80% when the thickness is 400 um.

Accordingly, the thickness of the phosphor layer PH applied on the phosphor wheel 430 preferably ranges from 50 um to 300 um in consideration of adhesion and luminance characteristics.

FIGS. 10A and 10B are diagrams illustrating examples 1 to 4 as well as a comparative example.

First, FIG. 10A is a diagram illustrating relative luminance in examples 1 to 4 and a comparative example, by using $Y_3Al_5O_{12}$:Ce as a first phosphor which is a yellow phosphor and $Lu_3Al_5O_{12}$:Ce as a second phosphor which is a green phosphor in the comparative example.

Example 1 shows that a relative luminance is 107% when $z=0.4$ in $Y(Al_{1-z},Ga_z)_5O_{12}$:Ce which is the yellow phosphor, when $x=0.2$ in $(Lu_{1-x}Y_x)_3Al_5O_{12}$:Ce which is the green phosphor, and when $y=0.3$ in $Y_3(Al_{1-y},Gd_y)_5O_{12}$:Ce which is the red phosphor.

Example 2 shows that a relative luminance is 104% when $x=0.2$ in $Y_3Al_5O_{12}$:Ce which is the yellow phosphor and in $(Lu_{1-x}Y_x)_3Al_5O_{12}$:Ce which is the green phosphor, and when $y=0.3$ in $Y_3(Al_{1-y},Gd_y)_5O_{12}$:Ce which is the red phosphor.

Example 3 shows that a relative luminance is 106% when $z=0.4$ in $Y(Al_{1-z},Ga_z)_5O_{12}$:Ce which is the yellow phosphor, when $x=0.3$ in $(Lu_{1-x}Y_x)_3Al_5O_{12}$:Ce which is the green phosphor, and when no red phosphor is used.

Example 4 shows that a relative luminance is 103% when $x=0.2$ in $Y_3Al_5O_{12}$:Ce which is the yellow phosphor and in $(Lu_{1-x}Y_x)_3Al_5O_{12}$:Ce which is the green phosphor, and when no red phosphor is used.

That is, all the examples 1 to 4 show a higher relative luminance than the comparative example, and thus the above examples 1 to 4 are applicable.

FIG. 10B is a diagram illustrating angles of phosphors in the respective examples and the comparative example.

Referring to the drawing, examples 1 and 2, in which three phosphors are used, show that an angle of a first phosphor which is the yellow phosphor is 61°, an angle of a second phosphor which is the green phosphor is 65°, and an angle of a third phosphor which is the red phosphor is 54°.

According to examples 1 and 2, a size of the first region which is the yellow region is greater than a size of a third region which is the red region, and a size of the third region which is the red region is less than a size of the second region which is the green region. Accordingly, highly efficient light output may be provided, and color purity may be improved.

In addition, examples 3 and 4 and the comparative example, in which two phosphors are used, show that an angle of the first phosphor which is the yellow phosphor is 115°, and an angle of the second phosphor which is the green phosphor is 65°.

According to examples 3 and 4, a size of the first region which is the yellow region is greater than a size of the second region which is the green region. Accordingly, highly efficient light output may be provided, and color purity may be improved.

Figure 10C:
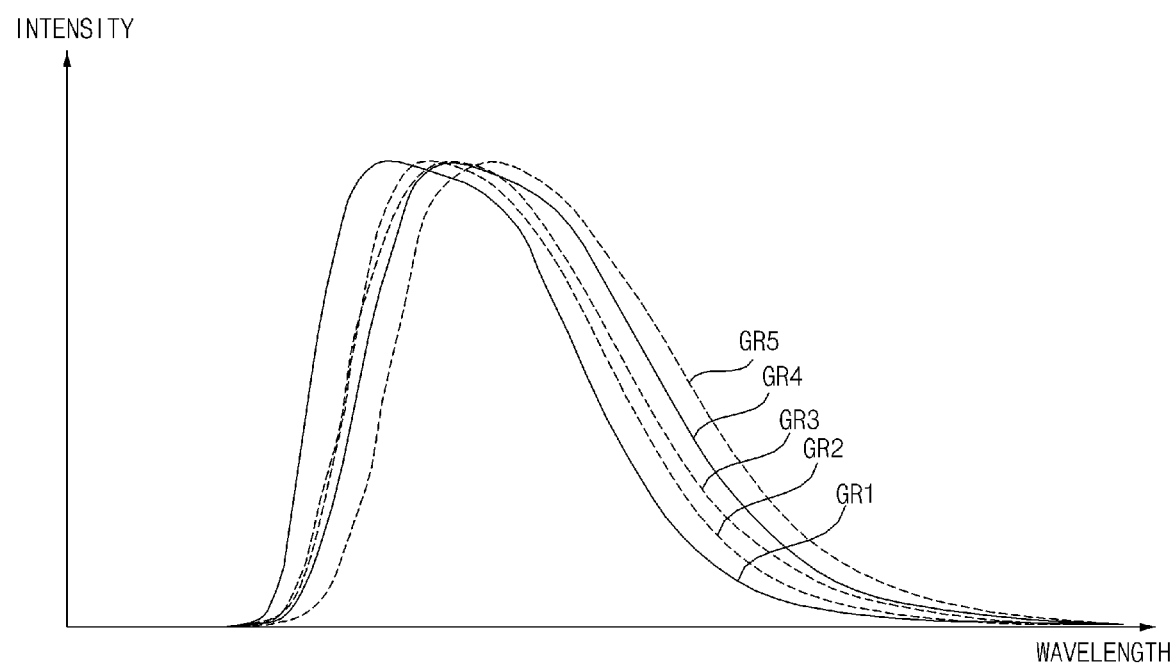

FIG. 10C is a diagram illustrating an emission spectrum graph of each phosphor in example 1 and the comparative example of FIG. 10A.

GR1 shows an emission spectrum of the yellow phosphor in the comparative example, and GR4 shows an emission spectrum of the green phosphor in the comparative example.

GR2 shows an emission spectrum of the green phosphor in example 1, GR3 shows an emission spectrum of the yellow phosphor in example 1, and GR5 shows an emission spectrum of the red phosphor in example 1.

By comparing GR1 and GR4 with GR2, GR3, and GR5, it can be seen that an emission wavelength is varied due to a change in composition of the phosphors in example 1, as compared to the comparative example.

Particularly, as a wavelength in the emission spectrum of the green phosphor becomes smaller compared to the comparative example, luminance efficiency and optical purity of the green phosphor may be greatly improved.

Figure 11:
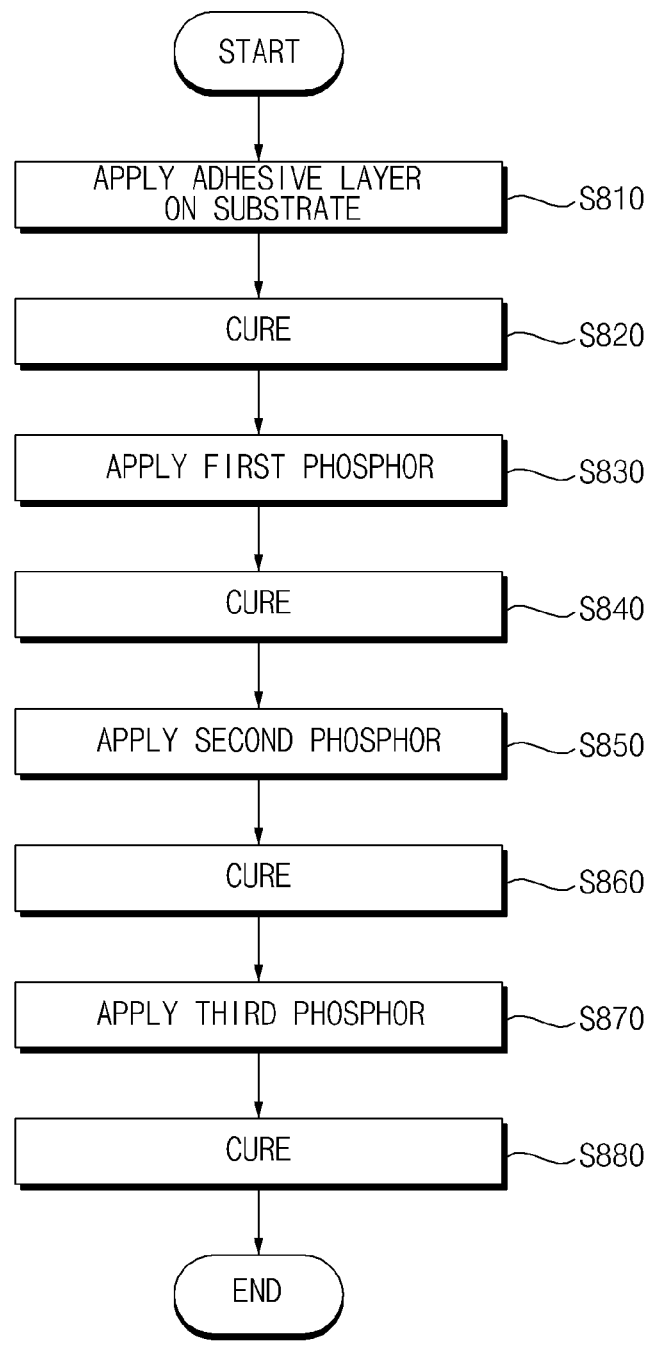

FIG. 11 is a flowchart illustrating a method of manufacturing the phosphor wheel 430b of FIG. 7.

Referring to the drawing, a reflective layer AF is applied on the substrate SB (S810). For example, by using an aluminum plate as the substrate and mixing TiO2 powder with a resin to prepare a paste, the paste is applied on the substrate using a bar coater and the like.

Then, the resulting product is cured at about 150° C. for a predetermined period of time (S820).

Subsequently, the first phosphor is applied (S830). For example, after mixing first phosphor powder with resin to prepare a paste, the paste is applied on the reflective layer AR using a bar coater and the like. In this case, the first phosphor may be a green phosphor. The green phosphor includes $(Lu_{1-x}Y_x)_3Al_5O_{12}$, in which it is preferable that 0<x<0.8.

Then, the resulting product is cured at about 150° C. for a predetermined period of time (S840).

Subsequently, a second phosphor is applied (S850). For example, after mixing second phosphor powder with resin to prepare a paste, the paste is applied on the reflective layer AR using a bar coater and the like. In this case, the second phosphor may be a yellow phosphor. The yellow phosphor includes $Y_3(Al_{1-y}Gd_y)_5O_{12}$:Ce, in which it is preferable that 0<y≤0.5.

Then, the resulting product is cured at about 150° C. for a predetermined period of time (S860).

Then, a third phosphor is applied (S870). For example, after mixing third phosphor powder with resin to prepare a paste, the paste is applied on the reflective layer AR using a bar coater and the like. In this case, the third phosphor may be a red phosphor. The red phosphor PHR includes $Y(Al_{1-z}Ga_z)_5O_{12}$:Ce, in which it is preferable that 0<z≤0.8.

Then, the resulting product is cured at about 150° C. for a predetermined period of time (S880).

As a result, the phosphor wheel 430b as illustrated in FIG. 7 may be manufactured.

The image projection apparatus according to the embodiments of the present disclosure as described above is not limited in its application of the configurations and methods, but the entirety or a portion of the embodiments can be selectively combined to be configured into various modifications.

While the present disclosure has been particularly shown and described with reference to preferred embodiments thereof, it will be understood by those skilled in the art that the present disclosure is not limited to those exemplary embodiments and various changes in form and details may be made therein without departing from the scope and spirit of the invention as defined by the appended claims and should not be individually understood from the technical spirit or prospect of the present disclosure.

What is claimed is:

1. An image projection apparatus comprising:
    a light source configured to output blue light; and
    a phosphor wheel configured to output a plurality of colors of light based on the blue light incident upon rotation,
    wherein the phosphor wheel comprises:
    a substrate;
    a reflective layer disposed on the substrate;
    a yellow phosphor in a first region of a phosphor layer disposed on the reflective layer for output of yellow light;
    a green phosphor in a second region of the phosphor layer disposed on the reflective layer for output of green light; and
    wherein a thickness of the phosphor layer including the yellow phosphor and the green phosphor is greater than a thickness of the reflective layer,
    wherein the green phosphor comprises (Lu1-xYx) 3Al5O12; Ce, with 0<x<0.8,
    wherein a host material coupled to a cerium (CE) dopant of the green phosphor does not include Aluminum Garnet (AG), and
    wherein the yellow phosphor comprises $Y_3(Al_{1-y}Gd_y)_5O_{12}$:Ce, with 0<y≤0.5.

2. The image projection apparatus of claim 1, wherein the green phosphor comprises $(Lu_{1-x}Y_x)_3Al_5O_{12}$: Ce (LuYAG), with 0<x<0.8.

3. The image projection apparatus of claim 1, wherein the green phosphor comprises $(Lu,Y)_3Al_5O_{12}$:Ce(LuYAG).

4. The image projection apparatus of claim 1, wherein a size of the first region is greater than a size of the second region.

5. The image projection apparatus of claim 1, further comprising a color filter placed behind an output end of the phosphor wheel, and sequentially output the yellow light, the green light, and red light upon rotation.

6. The image projection apparatus of claim 5, wherein the color filter further outputs blue light.

7. The image projection apparatus of claim 5, wherein the color filter comprises:
    a yellow region for output of the yellow light;
    a green region for output of the green light;

a red region for output of the red light; and a blue region for output of the blue light.

8. The image projection apparatus of claim 7, wherein a size of the yellow region or the blue region is less than a size of the red region or the green region.

9. The image projection apparatus of claim 1, wherein the phosphor wheel further comprises a red phosphor disposed in a third region on the substrate for output of red light, wherein the red phosphor comprises $Y(Al_{1-z},Ga_z)_5O_{12}$:Ce, with $0<z\leq0.8$.

10. An image projection apparatus comprising:

a light source configured to output blue light; and a phosphor wheel configured to output a plurality of colors of light based on the blue light incident upon rotation, wherein the phosphor wheel comprises:

a substrate;

a reflective layer disposed on the substrate;

a yellow phosphor in a first region of a phosphor layer disposed on the reflective layer for output of yellow light;

a green phosphor in a second region of the phosphor layer disposed on the reflective layer for output of green light;

a red phosphor disposed in a third region on the substrate for output of red light; and wherein a thickness of the phosphor layer including the yellow phosphor, the green phosphor, and the red phosphor is greater than a thickness of the reflective layer, wherein the green phosphor comprises $(Lu_{1-x}Y_x)3Al5O12$:Ce, with $0<x<0.8$, wherein a host material coupled to a cerium (CE) dopant of the green phosphor does not include Aluminum Garnet (AG), and wherein the yellow phosphor comprises $Y_3(Al_{1-y},Gd_y)_5O_{12}$:Ce, with $0<y<0.5$.

11. The image projection apparatus of claim 10, wherein the red phosphor comprises $Y(Al_{1-z},Ga_z)_5O_{12}$:Ce, with $0<z\leq0.8$.

12. The image projection apparatus of claim 10, wherein a size of the first region is greater than a size of the third region, and the size of the third region is less than a size of the second region.

13. The image projection apparatus of claim 10, further comprising a color filter placed behind an output end of the phosphor wheel, and to sequentially output the yellow light, the green light, the red light, and the blue light upon rotation.

* * * * *